J. E. COSTA.
CLEAN-OUT COVER.
APPLICATION FILED OCT. 22, 1910.
996,461.
Patented June 27, 1911.
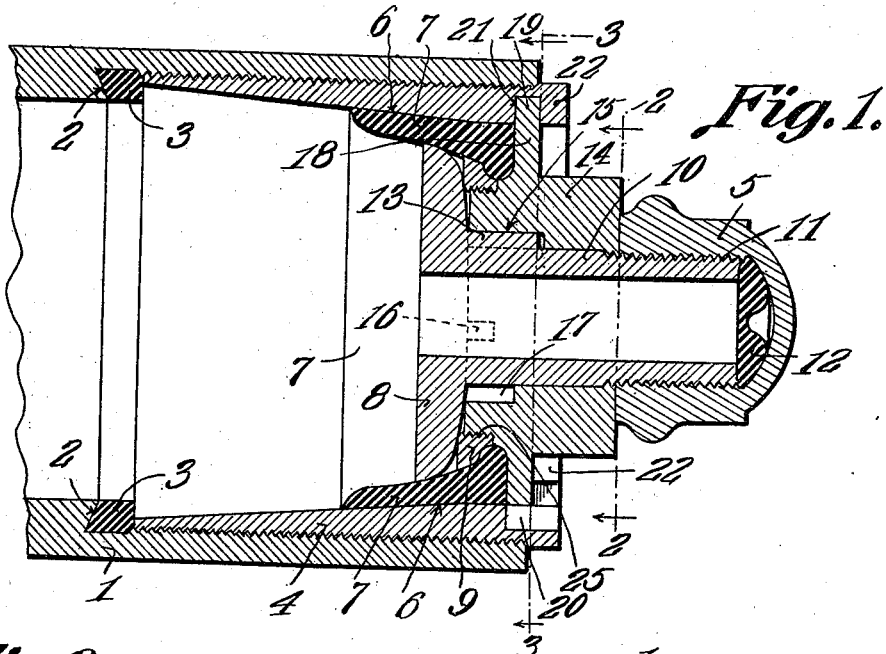
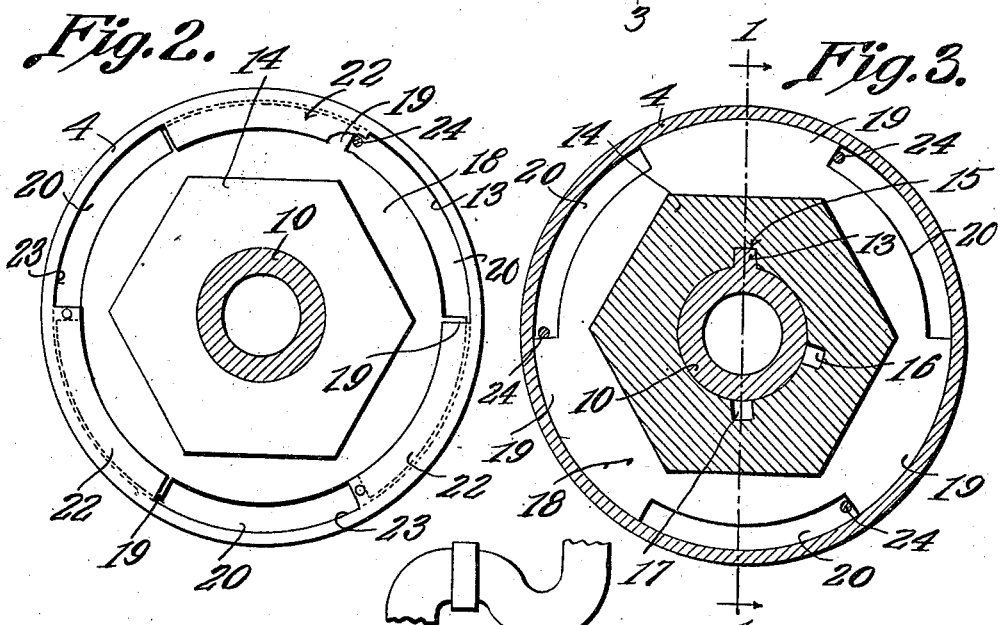
Witnesses.
Joseph E. Costa
Inventor
by C. A. Snow & Co.
Attorneys

UNITED STATES PATENT OFFICE.

JOSEPH E. COSTA, OF LOS ANGELES, CALIFORNIA.

CLEAN-OUT COVER.

996,461.  Specification of Letters Patent.  Patented June 27, 1911.

Application filed October 22, 1910. Serial No. 588,501.

*To all whom it may concern:*

Be it known that I, JOSEPH E. COSTA, a citizen of the United States, residing at Los Angeles, in the county of Los Angeles and State of California, have invented a new and useful Clean-Out Cover, of which the following is a specification.

This invention belongs to the art of drain pipe systems or installation, and it more particularly relates to a new and useful closure or cover for the clean-out opening of the drain pipe, and the object of the invention is to produce a novel form of closure, embodying several adjustments, in order to insure against any leakage.

A further object of the invention is to provide a supplemental closure which may be removed with ease, for cleaning out the drain pipe.

Other features and combinations of parts will be hereinafter more fully set forth, shown in the drawings, and claimed.

Figure 1 is a sectional view longitudinally through the end of a drain pipe and the closure, on a line 1—1 of Fig. 3. Fig. 2 is a sectional view on a line 2—2 of Fig. 1. Fig. 3 is a sectional view on a line 3—3 of Fig. 1. Fig. 4 is a detail view in side elevation of a portion of the drain pipe, showing the novel form of closure applied thereto.

Attention is directed to the annexed drawings in which the preferred form of the invention is disclosed; 1 denotes a drain pipe, upon the interior of which an annular shoulder 2 is formed and adjacent to the shoulder a washer or gasket 3 is arranged. This gasket or washer is arranged between the shoulder and the end of the sleeve 4 of the closure. This sleeve forms a part of what may be termed the closure proper, meaning the whole, while the cap nut 5 is termed the supplemental closure. The sleeve 4 is threaded into the end of the drain pipe 1, and by loosening or tightening up the sleeve the gasket 3 may be wedged tighter in its position. It will be observed that the inner cylindrical circumference or wall of the sleeve is slightly tapering from a point indicated by the character 6, which permits the gasket 7 to flare outwardly, as the valve disk 8 is drawn completely home. The valve disk 8 in Fig. 1 has been shown drawn entirely home. However, this is not the normal position of the valve disk. This position is the result of the third and last adjustment of the valve disk. The normal position of the valve disk would be adjacent the outer edge of the gasket 7, and not against the annular ring 9. The valve disk forms a part of the tubular member 10, the outer end of which is threaded as at 11, and to which threaded portion the supplemental closure or cap nut 5 is threaded. Between the supplemental closure or cap nut and the end of the threaded portion 11, a packing 12 is arranged, in order to insure against leakage. The tubular member 10, however, where it joins to the valve disk, is provided with a rib or lug 13 of a certain dimension. This tubular member 11 is passed through a cylindrical opening of the lock nut 14, as shown in Fig. 1. The inner circumference of the opening of this lock member is provided with a plurality of recesses 15, 16, and 17 of different lengths, into any one of which the lug 13 may be received. The recess 15 is longer than either one of the other two. The recess 16 is shorter in length than the other two, while the recess 17 is of a length intermediate the recesses 15 and 16. It will be observed by these recesses that there may be three distinct adjustments of the tubular member and its valve disk. The lug 13, as shown in Fig. 1, is received in the longest recess—therefore the valve disk is drawn completely home.

The lock member is provided with an annular flange 18, from the circumference of which a plurality of lugs 19 project, thereby providing intermediate recesses 20. The sleeve 4 next to its extreme outer end and upon its inner circumference is provided with an annular shoulder 21. Beyond the shoulder 21 the inner circumference of the sleeve is provided with a plurality of lugs 22 and recesses 23, the recesses 23 being located between the lugs. When the lugs of the sleeve are brought in registration with the recesses of the lock member, the lock member is permitted to enter slightly into the sleeve, until it is limited in its movement by the shoulder 21, and when such is the case, a partial rotary movement may be imparted to the lock member, which will bring the lugs of the lock member behind the lugs of the sleeve, thus preventing the removal of the lock member. A stop 24 is provided which limits the partial rotary movement of the lock member.

The annular ring 9 has its inner circumference threaded to engage the threads 25 of the lock member. By this annular ring 9 the gasket 7 is held to the lock member, as will be understood from Fig. 1. The gasket 7 is arranged in position upon the lock member, and subsequently the ring 9 is threaded into position as shown in Fig. 1, thus securing the gasket in position.

It will be observed that when the valve disk is arranged farther inwardly of the sleeve 4, the supplemental closure or cap nut 5 may be loosened and the lug 13 removed from the shortest recess, after which the nut 5 may be again tightened, which will permit the valve disk to be arranged approximately in its intermediate position.

When the pipe 1 becomes clogged, the same may be readily cleaned by removing the cap nut or supplemental closure 5.

Upon examining the drawings, in connection with the foregoing description, a clear understanding of the various features of the invention may be learned. It will be further observed that there has been provided a novel form of closure for drain pipes, and one that will permit of a plurality of adjustments, thereby insuring against leakage.

The invention having been set forth, what is claimed as new and useful is:

1. A closure device, comprising a sleeve, a lock member having a detachably connected gasket engageable with the inner circumference of the sleeve, said lock member and the sleeve having interlocking devices, a tubular member extending through the lock member and provided with an integral valve disk to be received within said gasket, and a cap nut or closure member threaded to the tubular member, including a packing between it and the end of the tubular member.

2. A closure device comprising a sleeve having its inner cylindrical circumference tapering approximately its entire length, a lock member partly receivable in the sleeve and provided with locking connections with the sleeve, a gasket detachably carried by the lock member, a tubular member extending through the lock member and provided with a valve disk receivable in the gasket to press the same outwardly against the tapering wall of the sleeve, said device including means for permitting the tubular member to be adjusted in several different positions, and a cap nut or closure threaded to the tubular member upon the exterior of the lock member.

3. A closure device for drain pipes including a sleeve threaded into the drain pipe and provided with a lock member receivable in the sleeve, and embodying locking connections therewith, said sleeve having means to limit the movement when interlocking the lock member in the sleeve, a gasket carried by the lock member, a valve disk receivable in the gasket and including a hollow shank extending through the lock member, and a closure member threaded to the hollow shank for closing the same and for adjusting the valve disk.

4. A closure device for drain pipes embodying a sleeve threaded into the drain pipe, said sleeve having a tapering inner cylindrical circumference and provided with a lock member detachably carried at its outer portion, said lock member having a gasket adapted to engage the inner circumference of the sleeve, a valve disk receivable within the gasket and provided with a hollow tubular member adapted to extend through the lock member, and a closure member adjustably threaded to the tubular member, said valve disk constituting means for pressing the gasket outwardly against the inner cylindrical tapering wall of the sleeve, when the closure member of the outer end of the tubular member is adjusted.

In testimony that I claim the foregoing as my own, I have hereto affixed my signature in the presence of two witnesses.

JOSEPH E. COSTA

Witnesses:
M. O. MOULD,
O. E. HORNBECK.